July 2, 1963     R. A. PELISHEK     3,095,742
COMFORT INDEX INDICATING MEANS
Filed Sept. 22, 1960
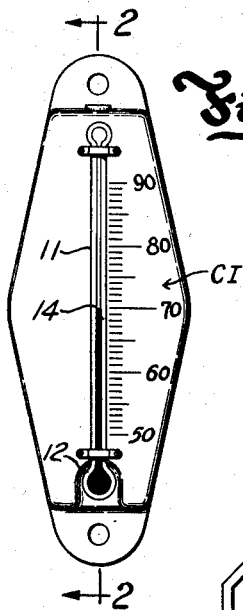
Fig. 1.
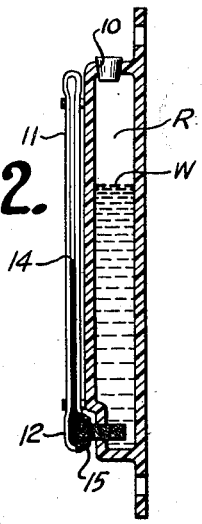
Fig. 2.
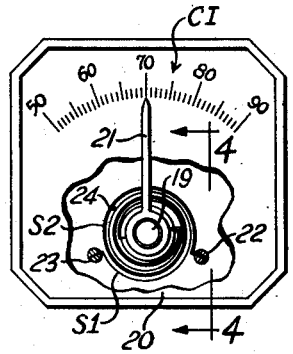
Fig. 3.
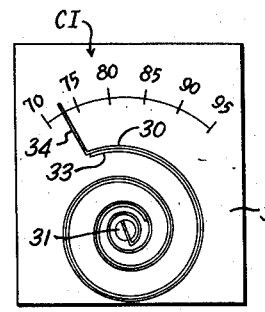
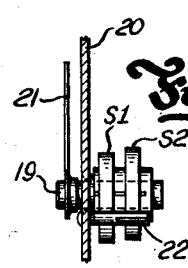
Fig. 4.
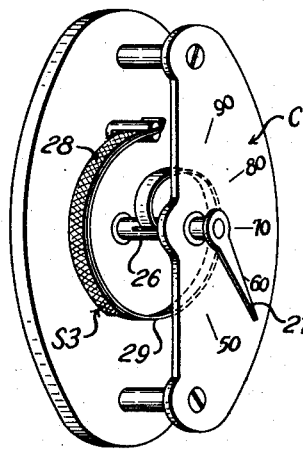
Fig. 6.
Fig. 5.
INVENTOR.
Roy A. Pelishek
BY Lieber, Lieber & Nilles
Attorneys

United States Patent Office 3,095,742
Patented July 2, 1963

3,095,742
COMFORT INDEX INDICATING MEANS
Roy A. Pelishek, 4419 Washington Road, Kenosha, Wis.
Filed Sept. 22, 1960, Ser. No. 57,716
4 Claims. (Cl. 73—336)

This invention relates generally to instruments for indicating conditions of weather. More particularly, this invention relates to an instrument of the above type for indicating the "comfort index" which is dependent on the humidity of the air as well as its temperature.

Various instruments have heretofore been proposed for measuring so-called "comfort index" or "effective" temperature, and were responsive to both dry bulb temperature and relative humidity.

Some of these prior art devices measure the humidity in the air by causing a humidity responsive material, such as a wooden block, to expand or contract and thus mechanically flex the bulb of the indicator to thereby vary the pressure on the indicating liquid and cause the latter to shift. As a result, devices such as these were not sufficiently responsive to changes in the weather conditions.

Other prior art devices utilized complicated linkage mechanisms or other arrangements for making both dry bulb temperature and humidity react on a single indicating means, usually a needle. These prior art structures were expensive to manufacture and because of their numerous parts were easily subject to malfunctioning and not sufficiently accurate or reliable in operation.

According to the present invention, means are provided which are responsive to the humidity conditions of the air; other means are provided which are responsive to the temperature of the surrounding air and which measure dry bulb temperature; the two means being arranged to give an indication of the comfort index on a "comfort index" scale, which scale is calibrated in accordance with a comfort index formula, namely—dry bulb temperature plus wet bulb temperatures times .4 plus 15.

Another aspect of the present invention provides a coil or spring-type, comfort index indicating instrument in which two separate springs or coils are connected to a single shaft for actuation thereof. An indicating needle is attached to this single shaft for movement over a comfort index scale. One of the coils is responsive to dry bulb temperature of the surrounding air while the other coil is moisture responsive for sensing the humidity conditions of the air. The net effect of the two coils then acts directly on the single shaft for moving the needle over the comfort index scale. The scale is also made generally in accordance with the formula—dry bulb temperature plus wet bulb temperature times .4 plus 15.

Still another aspect of the invention provides a spring type comfort index instrument which utilizes a single spring acting on a needle shaft. A portion of this single spring is made of a "bi-metal" material, such as for example, copper and steel, and is referred to as the "dry" part of the spring—it measures dry bulb temperature. The remaining portion of the spring is utilized to reflect the wet bulb temperature, and may be made of copper and covered with a humidity responsive material. The remaining portion is known as the "wet" part of the spring. In this manner a single spring measures both humidity conditions and dry bulb temperature of the air. The needle moves over a comfort index scale, as above described, to give a direct reading of the comfort index.

Yet another aspect of the invention provides a single spring of the bi-metal type used for indicating dry bulb temperature of the surrounding air, this spring having a moisture responsive material along one of its sides for sensing humidity of the air. The construction of this form of the invention is very simple—one end of the spring is anchored in place while the other end is adapted to move over a comfort index scale to indicate the comfort index.

Other objects and advantages will appear hereinafter as this disclosure progresses, reference being had to the following drawings in which:

FIGURE 1 is a front elevational view of a comfort index instrument made in accordance with the present invention;

FIGURE 2 is a sectional view taken generally along line 2—2 in FIGURE 1;

FIGURE 3 is an elevational view of another type of instrument made in accordance with the present invention;

FIGURE 4 is a view taken generally along line 4—4 in FIGURE 3;

FIGURE 5 is a perspective view of a third form of the present invention; and

FIGURE 6 is an elevational view of still another form of the invention.

Reference has been made and will hereinafter be made to a bi-metal spring or element. These bi-metal springs are in themselves conventional and are used for indicating the dry bulb temperature of the air. These elements may be constructed of different metals such as brass and copper together with steel, or other alloys may be used having different coefficients of expansion. At any rate, one side of these springs has greater linear expansion than the other.

The comfort index scale utilized with any form of the present invention is calibrated or laid out in accordance with the formula $(DB+WB)(.4)+15$, where DB is the dry bulb temperature and WB is the wet bulb temperature. This formula will give the comfort index for any combination of dry bulb and wet bulb temperatures and is an indication of a possible combination of temperature of the air and its humidity content. Stated otherwise, since this comfort index is a numerical index for comfort indication of a certain environment, it could be several different measurements of dry bulb and wet bulb temperatures and still result in the same figure. In any event, the scale provided by the present invention provides a means for readily determining what degree of comfort or discomfort exists as a result of temperature and moisture content of the atmosphere in any given location.

Referring in greater detail to the drawings, the scale CI is mounted on the front face of the reservoir R which contains an amount of fluid such as water W. A closeable opening 10 in the top of the reservoir is provided for maintaining a supply of water in the reservoir.

Mounted on the forward side of the scale is a closed glass tubular column 11 having a reservoir bulb portion 12 formed integrally therewith at the lower end. A temperature responsive fluid, alcohol or mercury, for example, is located in the reservoir 12 and is adapted to rise and fall in the hollow column 11 in accordance with the action to which the fluid in reservoir 12 is subjected. The top of the fluid column indicates the comfort index, and in the illustration shown the top of the column 14 is indicating a comfort index of about 70.

In accordance with the present invention, approximately one half of the outer surface of the reservoir 12 is covered with a moisture absorbent wick 15 and this wick extends through the reservoir R and into the water. The front portion of the reservoir 12 is open to the surrounding atmosphere and measures the dry bulb temperature thereof, while the rear portion of the reservoir 12 is used to measure the humidity content of the air due to the rate of evaporation of the moisture from the rear side of the reservoir 12. In other words, a portion of the reservoir is subjected to dry bulb temperature while the remaining portion is kept moist to indicate humidity.

The net effect of the two forces acting on the fluid in bulb reservoir 12 causes it to give an indication on the comfort index scale.

The comfort index scale has been calibrated in accordance with the above-mentioned formula, and the dry bulb temperature bears a straight line relationship to the wet bulb temperature. In other words, the comfort index scale is a straight line function of both the dry bulb and wet bulb temperatures. Because of this equal effect of the two temperatures, the reservoir 12 has been divided approximately into one half to indicate the wet bulb temperature. However this proportion may be varied slightly, one way or the other, and the scale CI graduated accordingly and thereby an accurate comfort index obtained without necessarily dividing the responsive surfaces of the reservoir 12 directly in two equal parts.

In the above-described embodiment, a single column of indicating fluid is shiftable due to both the temperature change caused by the evaporation rate from the wick and also due to the dry bulb temperature of the surrounding air. The device is extremely responsive to sudden and frequent changes of weather conditions and utilizes only a single bulb and scale.

Referring now to FIGURES 3 and 4, the scale CI shown is also made in accordance with the above formula—$(DB+WB)(.4)+15$. In this embodiment a single rotatable shaft 19 is mounted in a frame 20 and has an indicating needle 21 fixed to one of its ends for movement past the comfort index scale. A pair of temperature responsive coils is secured between the shaft and its support frame. These coils are in the form of springs S1 and S2. The first spring S1 is anchored at one of its ends to the post 23 in frame 20 and is then wound around the shaft where its other end is secured thereto. This spring is a bi-metal spring of the type previously referred to and is responsive only to the temperature of the surrounding air. As the temperature of the air changes the spring correspondingly winds or unwinds to move the needle over the scale.

The second spring S2 is anchored at its outer end to the post 22 in frame 20, is also wound around the shaft and its inner end is anchored to the shaft 19. On one side of this second spring is secured a moisture responsive material 24 which is moisture absorbent to sense the moisture condition of the air. The second spring acts, under influence of the moisture content of the air, to wind or unwind and thus cause the needle to move over the scale.

The moisture absorbent material referred to herein may be one of several types, such as paper, cellulose, or cellulose compounds. This absorbent material may be fastened to the metal by means of a suitable adhesive such as latex which will not dry out, stiffen, become brittle, or itself enter materially into the reaction of the elements.

Thus both the coils act with a single resultant effect on the needle to give an indication of comfort index. Force is exerted as between the springs only when the environment is not saturated (i.e. not raining) and the position of the pointer is established at the balance point of the forces. When it is raining, no difference in force exists and both would cause the needle to read the same. One of the coils actually acts to hold back the other, more specifically the "wet" coil S2 can provide a deflection equal to that of the "dry" coil S1 but it can never supply more of an actuating force than coil S1.

In this manner, the thermosensitive coil is responsive to the temperature of the air and the other coil is responsive to the rate of evaporation and both co-act directly on a single shaft. An accurate instrument with good response is thus provided for indicating comfort index in accordance with the net effect of the dry bulb and wet bulb temperature on a single indicating means.

In this embodiment also the scale is made in accordance with the above described formula in which the dry bulb and wet bulb temperatures are given equal consideration. However the relative strengths of the coils or springs could be changed slightly with a corresponding change in the calibration of the scale and thus it is not necessary to have springs of equal strength.

In the FIGURE 5 device, a single coil or spring S3 has been shown for acting on a single shaft 26. An indicating needle 27 is secured to shaft 26 and is adapted to move past the comfort index scale. In this embodiment approximately one half of the length of spring S3 may be of copper and a moisture responsive material 28 mounted on its surface and senses the moisture content of the air. The other portion 29 of the spring is of bi-metal material and reflects the dry bulb temperature of the air. Thus a single spring is used, a portion of which forms means for indicating humidity and other portion forms the means for indicating the dry bulb temperature, both means acting on the single shaft to cause needle movement past a scale calibrated generally according to the formula—

$$(DB+WB)(.4)+15.$$

Referring to the FIGURE 6 device, a single bi-metal coil spring 30 is used, one end being anchored in any suitable manner, such as for example, to a post 31 secured in the frame 32. As shown in the figure, the spring is wound outwardly from the post in a counterclockwise direction. A strip of moisture absorbent material 33 is secured along the inner side of the spring, that is, along that side of the spring which is of higher linear expansion.

With the arrangement shown in FIGURE 6, the bi-metal spring 30 would ordinarily reflect the dry bulb temperature of the air on a conventional dry bulb temperature scale. In accordance with the present invention, however, the moisture absorbent strip 33 influences the movement of the spring, to an extent which depends on the moisture content of the air. Thus the upturned end 34 of the spring, which acts as a pointer, moves past the comfort index scale CI to indicate the comfort index. This scale CI is also calibrated in accordance with the formula heretofore referred to.

The present invention provides an extremely responsive, accurate, simple, economical and reliable instrument for measuring the comfort index of the atmosphere.

Various modes of carrying out the invention are contemplated as being within the scope of the following claims particularly pointing out and distinctly claiming the subject matter which is regarded as the invention.

What is claimed and desired to be secured by Letters Patent is:

1. An instrument for indicating comfort index including, a scale developed in accordance with the formula $(DB+WB)(.4)+15$ where DB is the dry bulb temperature and WB is the wet bulb temperature of the air to be measured, a support frame, an oscillatable shaft mounted in said frame, a needle fixed to said shaft for oscillation therewith and over said scale, a thermosensitive coil acting directly on said shaft, a humidity sensitive coil acting directly on said shaft, whereby movement of said needle is in accordance with the net effect of said coils.

2. An instrument for indicating comfort index including, a scale developed in accordance with the formula $(DB+WB)(.4)+15$ where DB is the dry bulb temperature and WB is the wet bulb temperature of the air to be measured, a support frame, an oscillatable shaft mounted in said frame, a needle fixed to said shaft for oscillation therewith and over said scale, a coil secured directly between said hsaft and said frame, a portion of said coil having means responsive to humidity in said air, and another portion of said coil being responsive to dry bulb temperature of said air whereby said needle is responsive to the resultant effect of air temperature and humidity in accordance with said formula.

3. An instrument for indicating comfort index including, a comfort index scale developed in accordance with the formula $(DB+WB)(.4)+15$ where DB is the dry bulb temperature and WB is the wet bulb temperature of the air to be measured, a support frame, a bi-metal coil spring secured at one end to said frame, the other end of said spring having pointer means to indicate the comfort index on said scale, said spring having one side of a higher coefficient of linear expansion than an opposite side of said spring, and moisture absorbent material secured along said one side whereby said absorbent material senses the moisture content of the air and acts on said spring to cause said other end to give an indication of comfort index on said scale.

4. An instrument for indicating comfort index including, a support frame, a scale on said frame and developed in accordance with the formula $(DB+WB)(.4)+15$ where DB is the dry bulb temperature and WB is the wet bulb temperature of the air to be measured, shiftable indicating means for movement over said scale, coil spring means mounted on said frame and connected directly with said indicating means whereby winding and unwinding of said spring means causes said indicating means to move over said scale, said spring means including a bi-metal portion for measuring dry bulb temperature of the air and a moisture absorbent portion for measuring the wet bulb temperature of the air, said portions being formed together as an integral unit and both acting directly on said indicating means to cause the latter to indicate on said scale the net effect of said measuring portions.

References Cited in the file of this patent

UNITED STATES PATENTS

| | | |
|---|---|---|
| 2,010,040 | Shurtleff | Aug. 6, 1935 |
| 2,598,727 | Steinmetz | June 3, 1952 |
| 2,987,917 | Hevener | June 13, 1961 |

OTHER REFERENCES

Publication: Reprint, "Facts Behind the Weather Index," by Earl C. Thom. (Copy in Div. 36, single sheet, reverse side relied on.)